United States Patent
Osada et al.

[11] Patent Number: 5,346,770
[45] Date of Patent: Sep. 13, 1994

[54] LAMINATED GLASS STRUCTURE

[75] Inventors: Koichi Osada, Tokyo; Eiichi Ando; Akira Mitsui, both of Yokohama, all of Japan

[73] Assignee: Asahi Glass Company Ltd., Tokyo, Japan

[21] Appl. No.: 135,186

[22] Filed: Oct. 12, 1993

Related U.S. Application Data

[63] Continuation of Ser. No. 834,201, Feb. 12, 1992, abandoned.

[30] Foreign Application Priority Data

Feb. 14, 1991 [JP] Japan .................... 3-40857

[51] Int. Cl.$^5$ .............................................. B32B 15/00
[52] U.S. Cl. ................... 428/432; 428/334; 428/336; 428/436; 428/437; 428/469; 428/471; 428/472; 428/699; 428/701; 428/702
[58] Field of Search ............. 428/432, 437, 436, 336, 428/334, 699, 702, 469, 471, 472, 701

[56] References Cited

U.S. PATENT DOCUMENTS

| | | | |
|---|---|---|---|
| 4,844,985 | 7/1989 | Pharms et al. | 428/432 |
| 4,996,105 | 2/1991 | Oyama | 428/701 |
| 5,059,254 | 10/1991 | Yaba et al. | 136/251 |
| 5,061,568 | 10/1991 | Kessel | 428/701 |
| 5,070,230 | 12/1991 | Osada et al. | 219/203 |
| 5,149,351 | 9/1992 | Yaba et al. | 565/60.2 |
| 5,264,286 | 11/1993 | Ando et al. | 428/432 |

FOREIGN PATENT DOCUMENTS

| | | |
|---|---|---|
| 0076496 | 4/1983 | European Pat. Off. |
| 0077672 | 4/1983 | European Pat. Off. |
| 0386341 | 9/1990 | European Pat. Off. |
| 0433136 | 6/1991 | European Pat. Off. |

*Primary Examiner*—Ellis P. Robinson
*Assistant Examiner*—Timothy M. Speer
*Attorney, Agent, or Firm*—Oblon, Spivak, McClelland, Maier & Neustadt

[57] ABSTRACT

A laminated glass structure is provided containing at least one glass sheet, a plastic layer provided at the bonding surface of the glass sheet, and a functioning layer having single-or multi-layered films between the bonding surfaces of the glass sheet and the plastic layer, with the functioning layer having a controlling layer in contact with the plastic layer, which contains as the major component an oxide including Cr and at least one of Ti, Zn, Sn, Ni, Zr, Al, Si, Mg and Fe, and wherein the controlling layer has an atomic ratio of Cr to atoms other than oxygen of 60% or lower, and the film thickness of the controlling layer is 10 Å to 500 Å.

12 Claims, 1 Drawing Sheet

LAMINATED GLASS STRUCTURE

This application is a continuation of application Ser. No. 07/834,201, filed on Feb. 12, 1992, now abandoned.

BACKGROUND OF THE INVENTION

1. Field of the Invention

The present invention relates to a laminated glass structure. More particularly, it relates to a laminated glass structure comprising at least one glass sheet and layers of materials other than glass.

2. Description of the Background

Laminated glass assemblies have been widely used for windows and sun roofs for automobiles, windows for airplanes, ships and buildings and so on as so-called safety glass because pieces of glass do not scatter at the time of the breakage of a glass sheet and the penetration resistance to a shock is high. At present, the laminated glass assemblies have been widely used for a wind shield glass for automobiles from the viewpoint of assuring safety. There has been also proposed a type of laminated glass of which the bonding surface side is coated with a transparent conductive film so that the laminated glass has both defogging function and solar radiation reflecting function. As the transparent conductive film, a single-layered metal film such as an Au film or an Ag film, a single-layered metal oxide film such as an ITO film or a $SnO_2$ film or a multi-layered film wherein an Ag film is interposed between dielectric films of metal oxide such as ITO (Indium-Tin-Oxide), TiOx, SnOx, ZnOx have been used. Since the single-layered metal film and the single-layered metal oxide film have drawbacks in color tone, durability and electric resistance, the multi-layered film wherein the Ag film is interposed between the metal oxide films of dielectric substances has been widely used.

FIG. 3 shows an example of a conventional laminated glass structure in which a transparent conductive film is formed of a multi-layered film having an Ag film between dielectric films in order to give a defogging function and a solar radiation reflecting function.

The above-mentioned laminated glass has a plastic interlayer 13 made of polyvinyl butyral (PVB) at the bonding surface between a glass sheet 11 arranged at the exterior side of a vehicle and a glass sheet 12 arranged at the interior side, and an Ag film 16 is interposed between dielectric films 15, 17 such as ZnOx films as a dielectric substance which are arranged between the glass sheet 11 at the exterior side of the vehicle and the plastic interlayer 13, whereby a transparent conductive film 14 consisting of three-layered films is interposed between the glass sheet 11 and the plastic interlayer 13 so as to perform the both functions of defogging and solar radiation reflecting. The dielectric films 15, 17 are to increase visible light transmittance by an optical interference effect with the Ag film 16.

As the plastic interlayer 13, the PVB, EVA (ethylene-vinyl acetate copolymer), urethane or the like may be used. Especially, the PVB has been generally used for laminated glass assemblies for vehicles which require high level of safety because it has excellent penetration resistance, and is chemically and optically stable for a long period of time. In this case, a PVB film containing a predetermined amount of moisture is used in order to provide excellent penetration resistance.

In the conventional laminated glass structure as shown in FIG. 3, it is possible to impart a defogging function by heating the transparent conductive film 14 arranged at the bonding surface by supplying an electric current. Further, since the transparent conductive film 14 possesses a solar radiation reflecting function itself, a cooling load of air-condition can be reduced, so that it effectively functions to save energy.

However, it has been found that a phenomenon of turbidity occurs partially upon expiration of a long period of time in a case that a laminated glass is formed by arranging the above-mentioned transparent conductive film 14 consisting of a multi-layered film including therein the Ag film 16 between the dielectric films 15, 17 made of a metal oxide.

SUMMARY OF THE INVENTION

The inventors of this application have noted that the turbidity has occurred due to the layer in contact with the interlayer and have found that the turbidity can be prevented by using an oxide film including Cr and at least one selected from the group consisting of Ti, Zn, Sn, Ni, Zr, Al, Si, Mg and Fe, as the layer in contact with the interlayer.

In accordance with the present invention, there is provided a laminated glass structure which comprises at least one glass sheet, a plastic layer provided at the bonding surface of said glass sheet, and a functioning layer consisting of a single- or multi-layered films which is provided between the bonding surfaces of the glass sheet and the plastic layer, wherein said functioning layer has a controlling layer, as the layer in contact with the plastic layer, which comprises as the major component an oxide including Cr and at least one selected from the group consisting of Ti, Zn, Sn, Ni, Zr, Al, Si, Mg and Fe.

DESCRIPTION OF THE PREFERRED EMBODIMENTS

In the following, preferred embodiments of the laminated glass structure of the present invention will be described with reference to the drawings.

Figure 1:
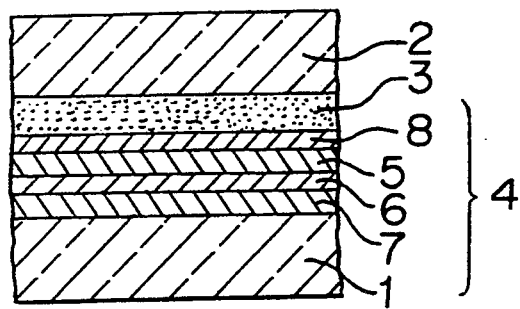
FIG. 1 is a longitudinal cross-sectional view showing an embodiment of the laminated glass structure according to the present invention.

FIG. 1 is a cross-sectional view of a first embodiment of the laminated glass structure of the present invention. The laminated glass structure shown in FIG. 1 comprises a functioning layer 4 consisting of a single- or multi-layered films at the bonding surface between a glass sheet 1 and a plastic layer 3. A controlling layer 8 which comprises as the major component an oxide including Cr and at least one selected from the group consisting of Ti, Zn, Sn, Ni, Zr, Al, Si, Mg and Fe is used as the layer contacting to the plastic layer 3 in the functioning layer 4.

In a case that the laminated glass structure of the present invention is applied to a laminated glass structure for a vehicle, FIG. 1 shows an example of the laminated glass structure comprising the glass sheet 1 at the exterior side of the vehicle and the glass sheet 2 at the interior side between which the plastic layer 3 is bonded as an interlayer, wherein the functioning layer 4 is formed at the bonding surface between the glass sheet 1 at the exterior side and the plastic layer 3.

As the functioning layer 4 in the present invention, various films having various kinds of function can be utilized, such as an optical function wherein light of a predetermined range of wavelength is selectively reflected, interrupted or transmitted, an electric function such as electrical heating for melting snow and ice, and for defogging, electromagnetic shielding or as an antenna for receiving or radiating electromagnetic waves, a photo-voltaic function such as a solar cell, an electrically light-controlling function such as light control by liquid crystal or an electrochromic material and so on.

FIG. 1 shows an example of the functioning layer 4 wherein a metal film 6 made of Ag or Au or the like is sandwiched between dielectric films 5, 7 which include a material such as ZnO, $SnO_2$, ITO or the like as the major component to thereby form a multi-layered film, and a controlling layer 8 is formed at the bonding surface of a plastic layer 3 as an interlayer. The functioning film 4 has a solar radiation reflecting function and an electric conductive function by the metal such as Ag, Au or the like. The dielectric films 5, 7 are to increase the visible transmittance of the functioning layer as a whole by an optical interference effect with the metal film 6.

When the content of Cr is too small in the controlling layer 8, turbidity is apt to occur upon expiration of a long period of time. On the other hand, when the content of Cr is too large, an aging change of the bonding strength to the plastic interlayer is apt to occur. Accordingly, the atomic ratio of Cr to atoms other than oxygen in the controlling layer 8 is determined to be 60% or lower, preferably in a range of 1%–60%, more preferably in a range of 10%–40%.

As the elements other than Cr in the controlling layer 8, there is at least one selected from the group consisting of Ti, Zn, Sn, Ni, Zr, Al, Si, Mg and Fe. When a sputtering target is to be prepared which is used for forming an oxide film of alloy by a sputtering method, films such as $TiCrxOy$, $NiCrxOy$, $ZrCrxOy$ or the like are preferably used because the melting point of each metal is close to each other, whereby the target can be easily prepared. In particular, $TiCrxOy$ is most preferably used because it has excellent functions of preventing the turbidity and the aging change of the bonding strength of the plastic interlayer. When the $TiCrxOy$ is used, the atomic ratio of Cr to atoms other than oxygen in the controlling layer 8 is 60% or lower, preferably in a range of 1%–60%, more preferably in a range of 10%–40%.

The film thickness of the controlling layer 8 is preferably 10 Å or more. When the film thickness is less than 10 Å, it tends to become an island-like structure, whereby it is difficult to cover the undercoat layer satisfactorily, and the characteristics of the controlling layer 8 are influenced by the undercoat layer. On the other hand, when the film thickness exceeds 500 Å, there is no change of the functions such as the prevention of turbidity and the prevention of aging change of the bonding strength, and accordingly, a film thickness of 500 Å or less is sufficient.

In the present invention, the functioning layer 4 is not in particular limited, but there are some examples as follows.

FIG. 1 shows an example of functioning layer having a transparent conductive film which includes a metal film, which comprises (glass/) dielectric film 7/metal film 6/dielectric film 5/controlling layer 8 (/interlayer). As for the metal film 6, metal such as Ag, Au, Pd, Cu, Pt or the like, or an alloy including these elements such as Ag-Pd, Ag-Cu or the like may be used. As a dielectric material used for the dielectric films 5, 7, ZnO, $TiO_2$, $SnO_2$, Al-, Si-, Ti-, Mg-, Sn-, Mg- or B- doped ZnO, F- or Sb- doped $SnO_2$, ITO (Sn-doped $In_2O_3$) or the like may be used.

In the functioning layer having the above mentioned structure, since the metal layer possesses an electric conductive property, it can be used as an electrically heating glass by providing electrically heating means such as a bus bar made of an electric-conductive print or the like. Further, since the metal film constitutes a transparent conductive film, and at the same time, possesses a solar radiation shielding function, it can be used as a solar radiation shielding glass even when the electrically heating means is not provided. As described above, the dielectric films 5, 7 at the both sides of the metal film 6 are to improve transmittance by optical interference.

Figure 2:
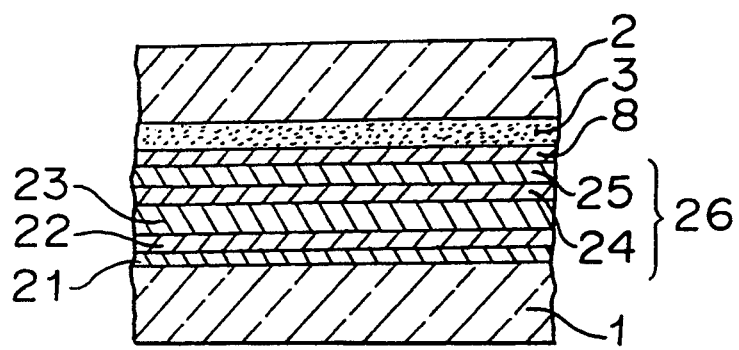
FIG. 2 is a longitudinal cross-sectional view showing another embodiment of the laminated glass structure according to the present invention.
Figure 3:
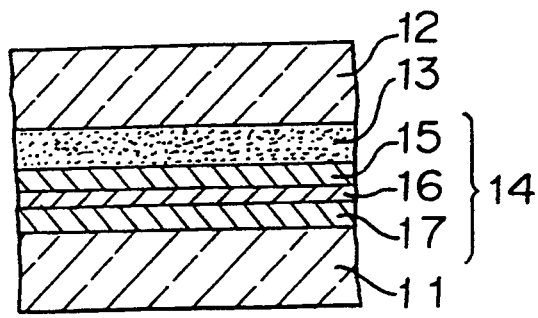
FIG. 3 is a longitudinal cross-sectional view showing a conventional laminated glass structure.

FIG. 2 is a longitudinal cross-sectional view showing another embodiment of the laminated glass structure according to the present invention wherein a thin film for a solar cell is used for the functioning layer 4.

Explanation will be made as to a case in which the laminated glass structure is used for a vehicle. Namely, an alkali barrier film 21 composed of $SiO_2$, $Al_2O_3$ or the like, a first transparent electrode 22 composed of $SnO_2$, ITO or the like, an amorphous silicon film 23, and a back electrode (a transparent conductive film) 26 are sequentially formed in this order on the interior side of a glass sheet 1 at the exterior side of a vehicle. When the glass sheets 1, 2 are assembled by interposing the plastic interlayer 3 therebetween, the controlling layer 8 is provided at the bonding surface between the plastic interlayer 3 and the back electrode 26. Thus, the functioning layer 4 comprises the multi-layered films 21–26 and 8.

The transparent conductive film 26 as the back electrode may be composed of two or three or more layers such as a metal film 24 and other film 25, or may be composed solely of one layer of the metal film 24, or composed of three layers of oxide/metal/oxide.

The metal film 24 may be a layer made of Ag, Au, Pd or Al or an alloy film made of at least two different kinds of these materials. Further, said other film 25 may be an oxide film such as ZnO, ZnS, $TiO_2$, ITO, $SnO_2$, or ZnO doped with Al or the like, or a film composed of a semiconductor material such as Si or the like.

Further, the functioning layer 4 may have such construction as (glass/) dielectric film 7/metal film 6/dielectric film 5 (controlling layer) (/interlayer) wherein the dielectric film 5 as shown in FIG. 1 is formed of a controlling layer. For instance, it may have the construction of (glass/) ZrO/Ag/TiCrxOy (/interlayer). It is not always necessary to use the same film as the controlling layer for the dielectric film 7 in contact with the glass sheet 1.

Further, as another example of the construction of the functioning layer 4, there are proposed such construction as (glass/) absorbing film/controlling layer 8 (/interlayer), or (glass/) dielectric film/absorbing film/dielectric film/controlling layer 8 (/interlayer) in order to utilize the solar radiation shielding function of the absorbing film. As the absorbing film, a film composed of a nitride, a boride, a carbide or a mixture thereof may be used. The dielectric film is to increase the visible transmittance by optical interference, which may be the same dielectric film as described with reference to FIG. 1. As concrete examples, there are (glass/) TiN/-TiCrxOy (/interlayer) or (glass/) TiO$_2$/TiN/TiO$_2$/SnCrxOy (/interlayer). In case that the controlling layer is not provided, the visible transmittance of the absorbing film may be increased by oxidization (for instance, TiN is partially changed to TiO$_2$). However, in accordance with the present invention, the oxidization of such absorbing film can be avoided.

As another example of the functioning film 4 wherein a transparent conductive film without any metal layer is used, there are (glass/) transparent conductive film/controlling layer 8 (/interlayer), or (glass/) alkali barrier film/transparent conductive film/controlling layer 8 (/interlayer). As the transparent conductive film, there are ITO (tin-doped indium oxide), F- or Sb-doped SnO$_2$, or Al, Si- or B-doped ZnO. As the alkali barrier film, there are SiO$_2$ or Al$_2$O$_3$ or the like. The alkali barrier film is to prevent the diffusion of alkali ions from glass into the transparent conductive film which thereby increases the resistance of the conductive film. A laminated glass in which such transparent conductive film is formed can be used as electromagnetic shielding glass or a glass antenna.

In the laminated glass structure having the above-mentioned films, another kind of film not mentioned above can be interposed between adjacent films or between a film and a glass sheet in order to improve bonding property or to adjust optical properties.

As a film-forming method for the functioning film 4, a spraying method, a vacuum vapor deposition method, a DC sputtering method, or a chemical vapor deposition method may be used. However, in view of the productivity and the film thickness uniformity, it is preferred to form films by the DC sputtering method.

In preparing a laminated glass having such functioning film and having a curved surface, glass sheets may be shaped to have a desired form before the films are formed on either of the glass sheets, or the films may be previously formed on a glass sheet and then, the glass sheets may be shaped to have a desired form.

In the present invention, sodalime silicate glass sheets, aluminosilicate glass sheets, borosilicate glass sheets, lithium aluminosilicate glass sheets or the like may be used for the glass sheets 1, 2 although the present invention is not limited thereto. It is especially preferable to use the sodalimesilicate glass sheets because they are available at a low cost. Further, a solar absorbing glass sheet having Ni, Cr, Co, Fe, Se or the like as additives may be used.

As the plastic interlayer 3 used for bonding the glass sheets 1, 2, PVB, EVA, urethane or the like may be used. However, when a laminated glass for a vehicle is to be prepared, it is preferred to use PVB having excellent resistance to penetration and durability.

Description above has been made as to laminated glass structures wherein two glass sheets are used. However, the present invention may also be applied to a laminated glass structure wherein three or more glass sheets are used. In a case that such a laminated glass structure is used for a vehicle, it is preferable that the functioning layer 4 is formed at the bonding surface of the glass sheet located at the outermost side.

Even though a laminated glass comprising two glass sheets and a plastic interlayer has been described as an Example of the laminated glass structure of the present invention, the present invention is applicable to a two-layered type laminated glass structure comprising a glass sheet and a plastic layer. Namely, it is applicable to such a construction of glass/functioning layer/plastic layer wherein the functioning layer has the above-mentioned controlling layer as the layer in contact with the plastic layer.

The plastic layer may be a single sheet of plastic layer made of the same material as the plastic interlayer 3, or it may be constituted by a multi-layered structure. For instance, it may have two-layered structure such as (glass/functioning layer/) energy absorbing layer/self-repairing layer. The energy absorbing layer and the self-repairing layer may be made of various kinds of urethane. The energy absorbing layer is to absorb a shock at the time of car accident or the like and to imparts excellent resistance to penetration. A plastic layer such as a polyethylene terephthalate film or a nylon film may be used for the self-repairing layer.

A conventional solar radiation reflecting glass had a laminated structure of dielectric substance/metal/dielectric substance which are laminated in this order wherein ZnO, ITO or SnO$_2$ was used for the dielectric substance and a Ag was used as metal. However, these layers caused turbidity at the peripheral portion of the laminated glass when a composite environment test of ultraviolet radiation and humidity resistance was conducted.

The inventors of this application have found that occurrence of turbidity at the peripheral portion of the laminated glass can be reduced to some extent by replacing the layer in contact with the plastic layer by a CrO layer. However, when the CrO layer is used, the bonding strength to the interlayer tends to increase upon expiration of a long period of time. Accordingly, further improvement in reliability on the laminated glass is considered to be necessary.

In the present invention, a layer comprising, as the major component, an oxide including Cr and at least one selected from the group consisting of Ti, Zn, Sn, Ni, Zr, Al, Si, Mg and Fe, is employed as the layer in contact with the plastic layer. The layer of an alloy oxide including Cr and Ti and so on provides such advantages of preventing the turbidity at the peripheral portion of the laminated glass, little aging change of the bonding strength to the plastic layer and providing high reliability for a long time. The fact that there is little aging change of the bonding strength upon expiration of a long period of time can be considered as follows. When TiO$_2$, ZnO, SnO$_2$, NiO, ZrO$_2$, Al$_2$O$_3$, SiO$_2$, MgO and Fe$_2$O$_3$ which show the decrease of the bonding strength are mixed with CrO which shows some increase of the bonding strength, the mutual influences by these compositions are cancelled, whereby the aging change of the bonding strength can be substantially eliminated.

The controlling layer 8 formed in contact with the plastic layer 3 in the present invention functions to provide high reliability for a long time and to effectively suppress occurrence of the turbidity when a material in which turbidity may occur by oxidation, e.g. a metal such as Ag or the like, is contained in the functioning layer.

In a case that a material in which the increase of transmittance may occur by oxidation, e.g. the absorbing layer, is included in the functioning layer, such increase of transmittance can be prevented by the present invention.

In the following, several Examples will be explained.

EXAMPLES 1-8

Laminated glass as shown in FIG. 1 were prepared by forming several kinds of functioning layer on a glass sheet by a sputtering method and bonding each of the functioning layers to another glass sheet by interposing a PVB film.

Tables 1 and 2 show the appearance and the change of bonding strength of the laminated glass after keeping them under condition of 50° C., an relative humidity atmosphere of 95% and irradiation of UV rays for 200 hours. In Tables 1 and 2, Examples 1 through 4 are Examples according to the present invention and Examples 5 through 8 are comparative Examples. Numerical values in the Tables indicate film thickness (Å), and each brackets shows the proportion of metals in the layer in contact with the PVB layer by atomic ratio.

TABLE 1

| | Film structure (Numerical values in Table show film thickness (Å) | Appearance | Change of bonding strength |
| --- | --- | --- | --- |
| Example 1 | G/ZnO/Ag/ZnO/TiCrOx/PVB 400 100 400 50 (Ti/Cr = 80/20) | No change | No change |
| Example 2 | G/ZnO/Ag/ZnO/NiCrOx/PVB 400 100 400 50 (Ni/Cr = 95/5) | No change | No change |
| Example 3 | G/ZnO/Ag/ZnO/ZnCrOx/PVB 400 100 400 50 (Zn/Cr = 80/20) | No change | No change |
| Example 4 | G/ZnO/Ag/ZnO/SnCrOx/PVB 400 100 400 50 (Sn/Cn = 80/20) | No change | No change |

TABLE 2

| | Film structure (Numerical values in Table show film thickness (Å) | Appearance | Change of bonding strength |
| --- | --- | --- | --- |
| Example 5 | G/ZnO/Ag/ZnO/PVB 400 100 400 | Turbid | Decrease |
| Example 6 | G/ITO/Ag/ITO/PVB 400 100 400 | Turbid | Decrease |
| Example 7 | G/SnO2/Ag/SnO2/PVB 400 100 400 | Turbid | Decrease |
| Example 8 | G/ZnO/Ag/CrO/PVB 400 100 400 | No change | Increase |

EXAMPLES 9 THROUGH 13

The laminated glass as shown in FIG. 1 were prepared by forming the layers of ZnO/Ag/ZnO/TiCrOx on a glass sheet by a sputtering method and bonding each of the layers to another glass plate by interposing a PVB layer. The TiCrOx layers in contact with the PVB layers were formed by a reactive sputtering method in an oxygen atmosphere with use of a TiCr alloy target.

Table 3 shows the appearance and the change of bonding strength after keeping them under condition of a temperature of 50° C., a relative humidity of 95% and irradiation of UV rays for 200 hours when the content of Cr in the TiCr alloy target is changed. In Table 3, Examples 10 through 15 are Examples according to the present invention and Examples 9 and 16 are Comparative Examples. Numerical values in the Table indicate film thickness (Å). Each bracket indicates the proportion of metals in the layer in contact with the PVB layer by atomic ratio.

TABLE 3

| | Film structure (Numerical values in Table show film thickness (Å) | Appearance | Change of bonding strength |
| --- | --- | --- | --- |
| Example 9 | G/ZnO/Ag/ZnO/TiO2/PVB 400 100 400 50 (Ti/Cr = 100/0) | Turbid | Decrease |
| Example 10 | G/ZnO/Ag/ZnO/TiCrOx/PVB 400 100 400 50 (Ti/Cr = 95/5) | No change | No change (Slight decrease) |
| Example 11 | G/ZnO/Ag/ZnO/TiCrOx/PVB 400 100 400 50 (Ti/Cr = 90/10) | No change | No change |
| Example 12 | G/ZnO/Ag/ZnO/TiCrOx/PVB 400 100 400 50 (Ti/Cr = 70/30) | No change | No change |
| Example 13 | G/ZnO/Ag/ZnO/TiCrOx/PVB 400 100 400 50 (Ti/Cr = 60/40) | No change | No change |
| Example 14 | G/ZnO/Ag/ZnO/TiCrOx/PVB 400 100 400 50 (Ti/Cr = 40/60) | No change | No change |
| Example 15 | G/ZnO/Ag/ZnO/TiCrOx/PVB 400 100 400 50 (Ti/Cr = 30/70) | No change | No change (Slight increase) |
| Example 16 | G/ZnO/Ag/ZnO/CrOx/PVB 400 100 400 50 (Ti/Cr = 0/100) | No change | Increase |

In the present invention, there is provided a laminated glass wherein turbidity and increase of the transmittance can be prevented and which is free from a change of the bonding strength for a long time, hence, is stable, even when a metal layer in which turbidity occurs by oxidation, or an absorbing layer in which increase in transmittance may occur, is comprised as the structural element of the functioning layer. In the conventional technique, the peripheral portion of the functioning layer was trimmed in order to avoid the turbidity of the peripheral portion. However the trimming operation is no longer necessary, whereby productivity can be remarkably improved.

In the laminated glass structure of the present invention, since there is no change of bonding strength for a long time, the laminated glass can provide high reliability for a long time.

The laminated glass structure of the present invention realizes a laminated glass having the functioning layer having various desired functions and reliable for a long period of time. Further, it can be preferably used not only for buildings but also for vehicles to which higher reliability is required.

What is claimed and desired to be secured by Letters Patent:

1. A laminated glass structure, which comprises:
   a) at least one glass sheet;
   b) a plastic layer provided at the bonding surface of said glass sheet; and
   c) a functioning layer consisting of single or multi-layered films which is provided between the bonding surfaces of the glass sheet and the plastic layer, wherein the functioning layer has a controlling layer as the layer in contact with the plastic layer, which comprises an effective amount of an oxide having the formula $MCr_xO_y$, wherein M is at least one element selected from the group consisting of Ti, Zn, Sn, Ni, Zr, Al, Mg and Fe; and wherein the atomic ratio of Cr to atoms other than oxygen in the controlling layer is from 10% to 60%, and wherein the film thickness of said controlling layer is from 10 Å to 500 Å.

2. The laminated glass structure according to claim 1, wherein the atomic ratio of Cr to the atoms other than oxygen in the controlling layer is in the range of 10–40%.

3. The laminated glass structure according to claim 1, wherein said controlling layer includes Ti.

4. The laminated glass structure according to claim 1, wherein said functioning layer comprises a transparent conductive film which includes a metal film, and said controlling layer as the layer in contact with the plastic layer.

5. The laminated glass structure according to claim 1, wherein said functioning layer comprises a solar radiation shielding film which includes a metal film, and said controlling layer as the layer in contact with the plastic layer.

6. The laminated glass structure according to claim 4, wherein said functioning layer comprises multi-layered films which are laminated in the order of dielectric film/metal film/dielectric film.

7. The laminated glass structure according to claim 5, wherein said functioning layer comprises multi-layered films which are laminated in the order of dielectric film/metal film/dielectric film.

8. The laminated glass structure in claim 1, wherein said plastic layer is a polyvinylbutyral film.

9. The laminated glass structure according to claim 6, wherein said metal film is selected from the group consisting of a film of Ag, Au, Pd, Cu, Pt, Ag-Pd and Ag-Cu.

10. The laminated glass structure according to claim 6, wherein said dielectric material is selected from the group consisting of a film of ZnO, $TiO_2$, Al-, Si-, Ti-, Mg-, Sn-, Mg- and B-doped ZnO, F- and Sb-doped $SnO_2$ and Sn-doped $In_2O_3$.

11. The laminated glass structure according to claim 7, wherein said metal film is selected from the group consisting of a film of Ag, Au, Pd, Cu, Pt, Ag-Pd and Ag-Cu.

12. The laminated glass structure according to claim 7, wherein said dielectric material is selected from the group consisting of a film of ZnO, $TiO_2$, Al-, Si-, Ti-, Mg-, Sn-, Mg- and B-doped ZnO, F- and Sb-doped $SnO_2$ and Sn-doped $In_2O_3$.

* * * * *